June 1, 1948.  M. TARASUK  2,442,670

FISHING REEL

Filed April 24, 1946

INVENTOR.
Michael Tarasuk
BY
Samuel Weisman
ATTORNEY.

Patented June 1, 1948

2,442,670

UNITED STATES PATENT OFFICE 2,442,670

FISHING REEL

Michael Tarasuk, Detroit, Mich.

Application April 24, 1946, Serial No. 664,600

10 Claims. (Cl. 242—84.6)

1

The present invention pertains to a novel fishing reel.

The principal object of the invention is to provide a fishing reel constructed of simple and inexpensive parts and assembled in a simple manner and securely.

Another object of the invention is to provide a device in the center of the reel for engaging the fishing rod, and in this connection there is also provided a non-rotatable bracket that braces the rod. As a further feature of the invention, the bracket is carried across the edges of the reel and is apertured to form a guide for the line.

Still another object of the invention is to provide an alarm that attracts the attention of the fisherman when the reel is unwound by a bite on the line.

In the accomplishment of these objects, the reel includes a hub with an internal bearing together with plates secured to the ends of the hub to form the frame or shell of the reel. The spool consists of a strip of metal rolled into a cylinder and inserted between the plates.

The means for attaching the reel to the rod consists of a U-shaped strap inserted in the bearing and having an exposed loop that encircles the rod. A nut is seated in the strap and is drawn up by a screw inserted in the opposite end of the bearing, whereby the loop is tightened on the rod. A bracket is mounted on the bearing adjacent to the loop and is formed with tongues engaging the rod to brace the same. The bracket is bent over the spaced edges of the plates and is apertured to form a guide for the line.

The alarm device consists of a flat spring extending freely through the plate adjacent to the bracket and having its opposite end fastened to the opposite plate. The fixed bracket carries a knob engageable by the free end of the flat spring when the reel is unwound. Under these conditions the spring strikes the knob and is vibrated in the manner of a reed, thereby producing a sound that attracts the attention of the fisherman.

The invention is fully disclosed by way of example in the following description and in the accompanying drawings in which.

2

Figure 1:
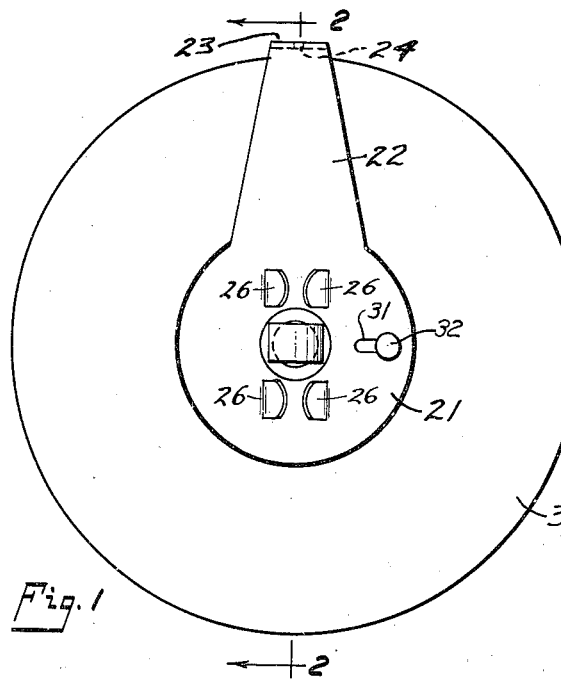
Figure 1 is an end view of the device.
Figure 2:
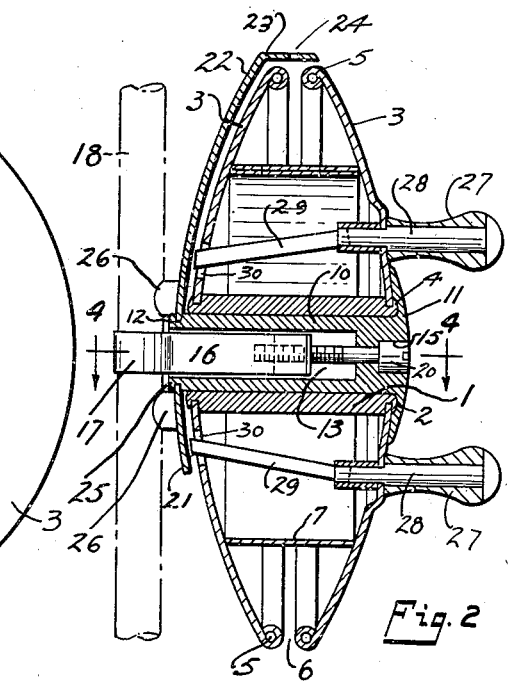
Figure 2 is a section on the line 2—2 of Figure 1.
Figure 4:
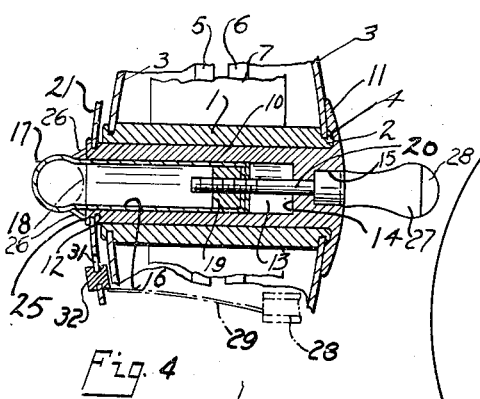
Figure 4 is a section on the line 4—4 of Figure 2.
Figure 5:
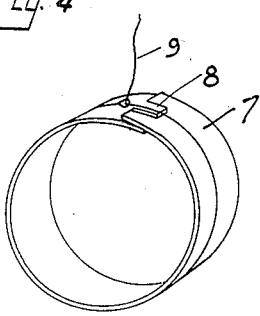
Figure 5 is a detail perspective view of the spool held by the noose in the line.
Figure 3:
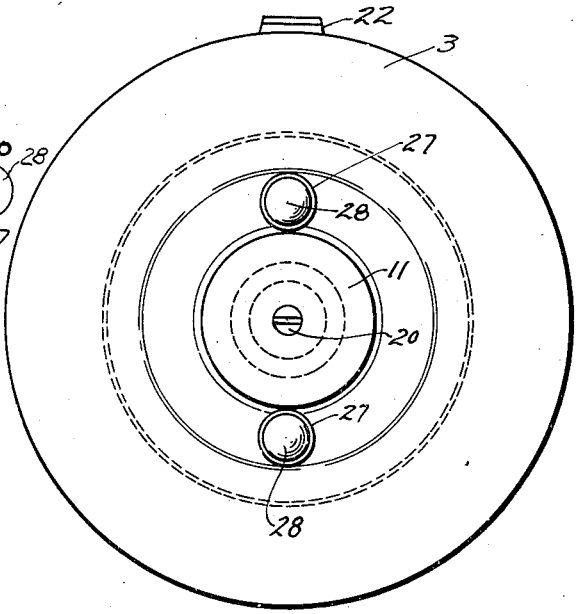
Figure 3 is the opposite end view.

Reference to these views will now be made by use of like characters which are employed to designate corresponding parts throughout.

The reel is built on a hub 1 having its ends reduced at 2. A pair of apertured side plates 3 are fitted centrally on the reduced ends 2, and the latter are peened at 4 to retain the plates. The plates are preferably dished to present a concave inner surface, and the edges thereof are beaded or rolled inward at 5, leaving an intervening space 6.

The winding spool of the reel consists merely of a strip 7 bent to a cylindrical form. The ends are joined by simple overlapping tongues 8 formed by cutting two parallel slits from each end of the sheet. The concavity of the plates 3 holds the spool 7 in proper position. A noose formed in the line 9 holds the spool from unfastening at the joined ends.

In the hub 1 is fitted a bearing member 10 projecting slightly beyond both ends of the hub. At one end the bearing is formed with a head 11 that overlaps the adjacent peened end of the hub. At the other end the bearing projects beyond the corresponding end of the hub and is reduced at 12 for a purpose that will presently appear.

The bearing 10 is formed with a cavity 13 from the last named end and having its bottom 14 disposed near the headed end. A countersunk recess 15 is formed from the head to the bottom 14 of the cavity 13 for a purpose that will presently be described.

In the cavity 13 is inserted a U-shaped strap 16 having a cylindrical portion 17 disposed beyond the reduced end 12. The cylindrical portion 17 receives a fishing rod 18. In the bottom of the strap 16 is seated a nut 19 which is threaded on a screw 20 passed through the recess 15 and through the bottom of the strap 16.

On the reduced end 12 of the bearing 10 is fitted the circular portion 21 of the bracket which includes also a strip portion 22 extending radially along the adjacent plate 3 and formed with a bent end 23 bridging the space between the beaded edges 5. The end 23 is formed with an aperture 24 which guides the line 9 to the spool 7. The reduced end 12 is peened at 25 to retain the bracket.

A pair of tongues 26 is stamped angularly outward from the bracket portion 21 above and below the cylindrical portion 17 of the strap 16. The tongues of each pair are spaced to straddle the rod 18 above and below the loop 17 and thereby brace the rod.

The opposite plate 3 carries a pair of rotary handles 27 mounted respectively on headed pins 28 passing through the plate 3 and suitably fastened therein as by welding. To the inner end of each pin 28 is fastened one end of a flat spring 29 projecting slightly through a slot 30 in the opposite plate 3.

The circular bracket portion 21 is formed near its edge with a radial slot 31 in which is slidably mounted a knob 32. The knob is normally adjusted to the outer end of the slot 32 where it lies in the path of the springs 29.

This portion of the device is used when the fisherman is relaxing or not particularly attentive while holding the rod. A bite on the line will cause the plates 3 and spool 7 to rotate about the bearing 10 and relatively to the bracket 21, 22 and rod 18. In this rotation the flat springs 29 strike the knob 32 on each revolution and are thereby vibrated to produce a sound that attracts the attention of the fisherman and apprises him that he has a bite, so that he may commence to wind in the reel.

It will be noted, moreover, that the assembly of the reel is relatively simple and provides an inexpensive and effective means for mounting the reel on the rod and bracing it with respect thereto.

Although a specific embodiment of the invention has been illustrated and described, it will be understood that various alterations in the details of construction may be made without departing from the scope of the invention as indicated by the appended claims.

What I claim is:

1. A fishing reel comprising a hub, a bearing therein, a pair of spaced plates secured to the ends of said hub, a spool between said plates, a strap inserted in one end of said bearing and shaped to receive a rod, a nut in said strap, and a screw inserted in the other end of said bearing and engaged with said nut.

2. A fishing reel comprising a hub, a bearing therein, a pair of spaced plates secured to the ends of said hub, a spool between said plates, a strap inserted in one end of said bearing and shaped to receive a rod, a nut in said strap, a screw inserted in the other end of said bearing and engaged with said nut, a bracket mounted at the first named end of said bearing, and tongues stamped out of said bracket and adapted to engage a rod.

3. A fishing reel comprising a hub, a bearing therein, a pair of spaced plates secured to the ends of said hub, a spool between said plates, a strap inserted in one end of said bearing and shaped to receive a rod, a nut in said strap, a screw inserted in the other end of said bearing and engaged with said nut, a bracket mounted at the first named end of said bearing, and tongues stamped out of said bracket at opposite sides of said strap and adapted to engage a rod.

4. A fishing reel comprising a hub, a bearing therein, a pair of spaced plates secured to the ends of said hub, a spool between said plates, a strap inserted in one end of said bearing and having an exposed loop adapted to encircle a rod, a nut in said strap, and a screw inserted in the other end of said bearing and engaged with said nut.

5. A fishing reel comprising a hub, a bearing therein, a pair of spaced plates secured to the ends of said hub, a spool between said plates, a strap inserted in one end of said bearing and having an exposed loop adapted to encircle a rod, a nut in said strap, a screw inserted in the other end of said bearing and engaged with said nut, a bracket mounted at the first named end of said bearing, and tongues stamped out of said bracket at opposite sides of said loop and adapted to engage a rod.

6. A fishing reel comprising a hub, a bearing therein, a pair of spaced plates secured to the ends of said hub, a spool between said plates, a bracket mounted at one end of said bearing, tongues stamped out of said bracket and adapted to engage a rod, said bracket having a bent end bridging the space between the edges of said plates, said end being apertured for guiding a line to said spool.

7. A fishing reel comprising a hub, a bearing therein, a pair of spaced plates secured to the ends of said hub, a spool between said plates, a strap inserted in one end of said bearing and shaped to receive a rod, a nut in said strap, a screw inserted in the other end of said bearing and engaged with said nut, a bracket mounted at the first named end of said bearing, said bracket having a bent end bridging the space between the edges of said plates, said end being apertured for guiding a line to said spool.

8. A fishing reel comprising a hub, a bearing therein, a pair of spaced plates secured to the ends of said hub, a spool between said plates, a bracket mounted at one end of said bearing, a flat spring having one end secured to the plate opposite said bracket and passing through the other plate, and a knob mounted in said bracket and engageable by the free end of said spring.

9. A fishing reel comprising a hub, a bearing therein, a pair of spaced plates secured to the ends of said hub, a spool between said plates, a bracket mounted at one end of said bearing, a handle mounted on the plate opposite said bracket, a flat spring having one end secured to said handle and passing through the other plate, and a knob mounted in said bracket and engageable by the free end of said spring.

10. A fishing reel comprising a hub, a bearing therein, a pair of spaced plates secured to the ends of said hub, a spool between said plates, a bracket mounted at one end of said bearing, tongues stamped out of said bracket and adapted to engage a rod, and a flat spring having one end secured to the plate opposite said bracket and passing through the other plate, and a knob mounted in said bracket and engageable by the free end of said spring.

MICHAEL TARASUK.